United States Patent
Kacin et al.

(10) Patent No.: US 7,890,615 B2
(45) Date of Patent: Feb. 15, 2011

(54) ARCHITECTURE AND PROTOCOL FOR EXTENSIBLE AND SCALABLE COMMUNICATION

(75) Inventors: Martin Kacin, Palo Alto, CA (US); Michael Gray, Dublin, OH (US); Andrew Velline, Redwood City, CA (US)

(73) Assignee: Kace Networks, Inc., Mountain View, CA (US)

( * ) Notice: Subject to any disclaimer, the term of this patent is extended or adjusted under 35 U.S.C. 154(b) by 141 days.

(21) Appl. No.: 12/206,635

(22) Filed: Sep. 8, 2008

(65) Prior Publication Data

US 2009/0070442 A1 Mar. 12, 2009

Related U.S. Application Data

(60) Provisional application No. 60/970,863, filed on Sep. 7, 2007.

(51) Int. Cl.
*G06F 15/16* (2006.01)
(52) U.S. Cl. ...................................... 709/221; 709/227
(58) Field of Classification Search ......... 709/200–203, 709/217–229
See application file for complete search history.

(56) References Cited

U.S. PATENT DOCUMENTS

| | | | |
|---|---|---|---|
| 6,825,941 B1 | 11/2004 | Nguyen et al. | |
| 7,058,085 B2 | 6/2006 | Earnshaw et al. | |
| 7,152,111 B2 | 12/2006 | Allred et al. | |
| 7,389,505 B2 * | 6/2008 | Berenberg et al. | 717/172 |
| 7,409,463 B2 * | 8/2008 | Ramachandran | 709/246 |
| 2003/0140139 A1 | 7/2003 | Marejka et al. | |
| 2004/0019612 A1 * | 1/2004 | Tyra et al. | 707/104.1 |
| 2005/0235352 A1 * | 10/2005 | Staats et al. | 726/14 |
| 2006/0026590 A1 * | 2/2006 | Berenberg et al. | 717/175 |
| 2006/0031520 A1 * | 2/2006 | Bedekar et al. | 709/227 |
| 2006/0064486 A1 * | 3/2006 | Baron et al. | 709/224 |
| 2006/0258342 A1 * | 11/2006 | Fok et al. | 455/414.1 |
| 2007/0043860 A1 | 2/2007 | Pabari | |
| 2007/0294662 A1 * | 12/2007 | Kim et al. | 717/107 |
| 2008/0189702 A1 * | 8/2008 | Morgan et al. | 718/100 |
| 2008/0244554 A1 * | 10/2008 | Kadashevich | 717/168 |
| 2009/0044185 A1 * | 2/2009 | Krivopaltsev | 717/173 |

OTHER PUBLICATIONS

PCT International Search Report and Written Opinion, PCT Application No. PCT/US2008/075624, Nov. 18, 2008, 7 pages.

* cited by examiner

*Primary Examiner*—Moustafa M Meky
(74) *Attorney, Agent, or Firm*—Baker Botts L.L.P.

(57) ABSTRACT

A system performs information technology (IT) tasks using a computer. Examples of IT tasks include installing or configuring software, displaying alerts, executing programs or scripts on the endpoint, or logging activities. In an embodiment of the system, a connection initialization module receives a request for a persistent connection over a network from a managed endpoint. The request is accepted and a persistent connection is opened with the managed endpoint. A tier-1 module then receives configuration information from the managed endpoint over the persistent connection. The configuration information includes a list of functional plugins on the managed endpoint, where a functional plugin comprises a software module for performing an IT task. The tier-1 module stores this configuration information along with information describing the persistent connection and maintains the persistent connection in an open state.

24 Claims, 6 Drawing Sheets

ARCHITECTURE AND PROTOCOL FOR EXTENSIBLE AND SCALABLE COMMUNICATION

CROSS-REFERENCE TO RELATED APPLICATIONS

This application claims the benefit of U.S. Provisional Application No. 60/970,863, filed Sep. 7, 2007, which is hereby incorporated in its entirety by reference.

FIELD OF THE INVENTION

This invention relates generally to information technology (IT) systems, and more specifically to systems and methods for automating and deploying IT solutions in an enterprise environment.

BACKGROUND OF THE INVENTION

An enterprise environment includes multiple managed endpoints, such as user workstations, switches, and routers. This enterprise environment is managed by management computers that perform various information technology (IT) tasks on the managed endpoints. For example, a management computer may install software or patches on the managed endpoints, send messages to the managed endpoints, reconfigure the managed endpoints, or receive information describing the configuration or status of the managed endpoints.

Often, performing an IT task requires software support on both the management computer and managed endpoint. Similar IT tasks may need to be performed on several managed endpoints with varying hardware and software configurations. As a result, installing and maintaining the necessary support software on all of the managed endpoints is often a difficult process.

Additionally, the management computer often needs to communicate with the managed endpoints in order to perform IT tasks. A single management computer may be communicating with thousands of managed endpoints. Establishing a new communication channel with a managed endpoint each time a communication is necessary can result in significant overhead, particularly when the management computer attempts to establish communication with multiple managed endpoints that have gone offline.

What is needed are systems and methods for installing and maintaining software on managed endpoints for supporting IT tasks. Also needed are systems and methods for efficiently communicating with managed endpoints to perform IT tasks.

SUMMARY

The above need is met by a system, method, and computer program product for performing information technology (IT) tasks using a computer. Examples of IT tasks include installing or configuring software, displaying alerts, or logging activities. In an embodiment of the system and computer program product, a connection initialization module receives a request for a persistent connection over a network from a managed endpoint. The request is accepted and a persistent connection is opened with the managed endpoint. A tier-1 module then receives configuration information from the managed endpoint over the persistent connection. The configuration information includes a list of functional plugins on the managed endpoint, where a functional plugin comprises a software module for performing an IT task. The tier-1 module stores this configuration information along with information describing the persistent connection and maintains the persistent connection in an open state.

The figures depict embodiments of the invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
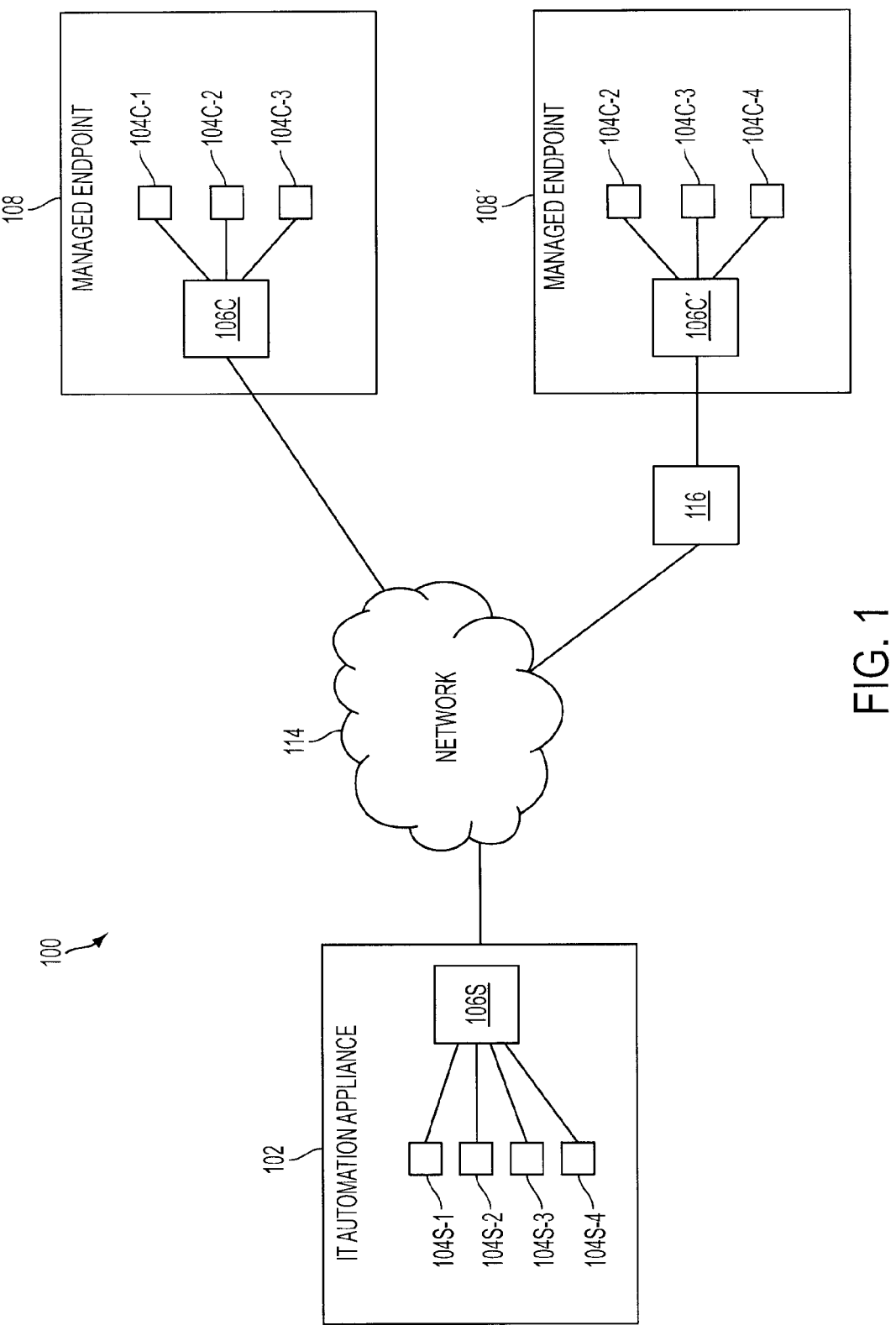
FIG. 1 is a high-level diagram illustrating an environment including an information technology (IT) automation appliance for carrying out IT tasks on managed endpoints, in one embodiment.

FIG. 1 is a high-level diagram illustrating an environment 100 including an information technology (IT) automation appliance 102 (the "appliance") for carrying out IT tasks on managed endpoints 108, in one embodiment. The managed endpoints 108 are computing devices such as user workstations or routers. IT tasks include, for example, installing software programs or patches on the managed endpoints 108, sending alerts to the managed endpoints, reconfiguring the managed endpoints, executing programs or computer scripts on the managed endpoints, or logging activity on the managed endpoints. The appliance 102 may be configured to perform various IT tasks by an operator, such as a member of an IT staff. FIG. 1 shows an environment 100 with one appliance 102 and two managed endpoints 108. However, the environment 100 may contain thousands of managed endpoints 108 communicating with the appliance 102. Also, the environment 100 may contain multiple appliances 102, possibly with some appliances used for backup or load balancing purposes. The appliance 102 and managed endpoints 108 communicate through a network 114, such as the Internet or a corporate intranet. A managed endpoint 108 may be placed behind a firewall 116, further described below, to improve the security of the managed endpoint.

The appliance 102 and managed endpoints 108 contain plugins 104 and 106 that provide functionality that enables the performance of IT tasks. The plugins 104 and 106 are software modules running in the appliance 102 and managed endpoints 108, in one embodiment. The plugins 104 and 106 can include a user interface and can access storage devices or other resources on appliances 102 and managed endpoints 108. The plugins 104 and 106 can run in processes or libraries. The performance of IT tasks often requires support from both the appliance 102 and managed endpoints 108. As a result, various appliance plugins 104S and 106S cooperate with corresponding managed endpoint plugins 104C and 106C. For example, plugin 104S-3 cooperates with plugins 104C-3 on endpoints 108 and 108' to perform a particular IT task.

Appliance and endpoint plugins 104 and 106 include, for example, executable program instructions. Plugins 104 and 106 can be implemented to run on multiple platforms with varying hardware and software configurations. For example, a plugin 104 on an appliance 102 running a particular operating system may communicate with plugins 104 on endpoints 108 with various other operating systems. Since the plugins 104 are designed with a modular interface as described below, a common source code base can be maintained for a particular plugin 104, and the code can merely be compiled differently for different platforms.

Plugins 104 are referred to as "functional" plugins and provide functionality to the appliance 102 and endpoints 108 for performing IT tasks. For example, a pair of functional plugins 104S-2 and 104C-2 may be used for logging activity on managed endpoints 108. The function plugin 104C-2 on the endpoint 108 can monitor the activities taking place on the endpoint and communicate them to the functional plugin 104S-2 on the appliance 102 which stores the activities to a log file. Other communications may take place between the pair of functional plugins 104, such as commands to start or stop monitoring the activities.

Some plugins 106 are referred to as "built-in" plugins and handle communications over the network 114 between appliance functional plugins 104S and endpoint functional plugins 104C. In one embodiment, a pair of built-in plugins 106S and 106C maintains a persistent connection between the appliance 102 and a managed endpoint 108. This persistent connection can be used for communication by various functional plugins 104, such as communication between plugins 104S-1 and 104C-1, for example. The persistent connection can also enable control communications between built-in plugins 106S and 106C such as status updates or configuration information. Built-in plugins 106 also provide management services for functional plugins 104. A built-in plugin 106C can install, remove, and update functional plugins 104C. The built-in plugin 106C can also maintain a manifest (e.g., a list) of installed plugins 104C and their statuses.

Figure 2:
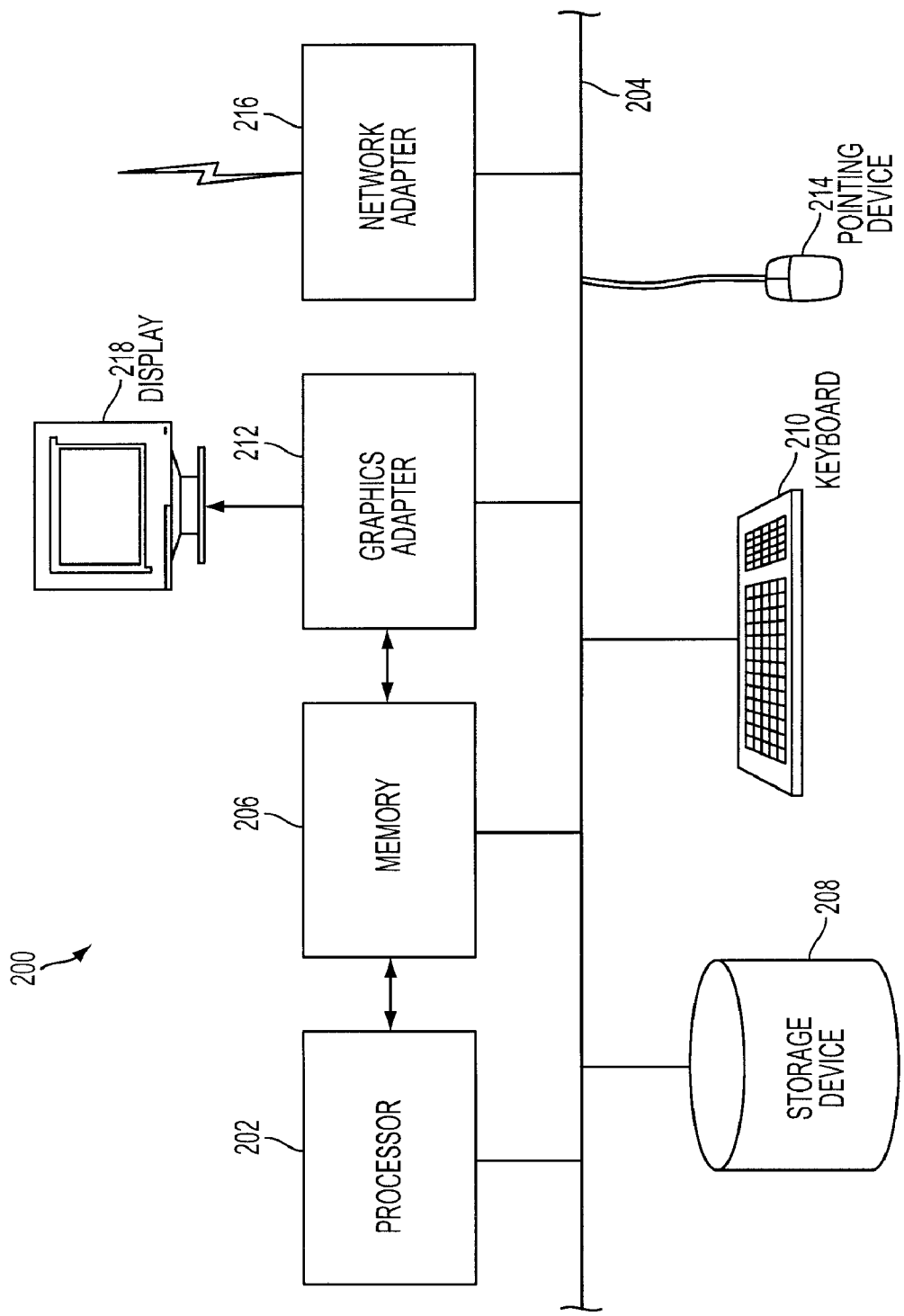
FIG. 2 is a block diagram illustrating a computer that can serve as an embodiment of an IT automation appliance or a managed endpoint, in one embodiment.

FIG. 2 is a block diagram illustrating a computer 200 that can serve as an embodiment of an IT automation appliance 102 or a managed endpoint 108, in one embodiment. Illustrated are at least one processor 202 coupled to a bus 204. Also coupled to the bus are a memory 206, a storage device 208, a keyboard 210, a graphics adapter 212, a pointing device 214, and a network adapter 216. A display 218 is coupled to the graphics adapter 212. The storage device 208 is a device such as a hard drive, CD or DVD drive, or flash memory device, and holds files containing executable code and/or data utilized during the operation of the computer 200. The memory 206, in one embodiment, is a random access memory (RAM) and holds instructions and data loaded from the storage device 208, generated during processing, and/or from other sources.

Computers acting in different roles may have different and/or additional elements than the ones shown in FIG. 2. For example, a computer 200 acting as an appliance 102 may have greater processing power and a larger storage device than a computer acting as a managed endpoint 108. Likewise, a computer 200 acting as an appliance 102 may lack devices such as a display 218 and/or keyboard 210 that are not necessarily required to operate it.

The computer 200 executes one or more operating systems such as a variant of MICROSOFT WINDOWS or LINUX. In general, the operating system executes one or more application programs. The operating system and application programs executed by the computer are formed of one or more processes. This description utilizes the term "module" to refer to computer program logic for providing a specified functionality. A module can be implemented in hardware, firmware, and/or software. A module is typically stored on the storage device 208, loaded into the memory 206, and executed by the processor 202. A module can include one or more processes, and/or be provided by only part of a process.

Figure 3:
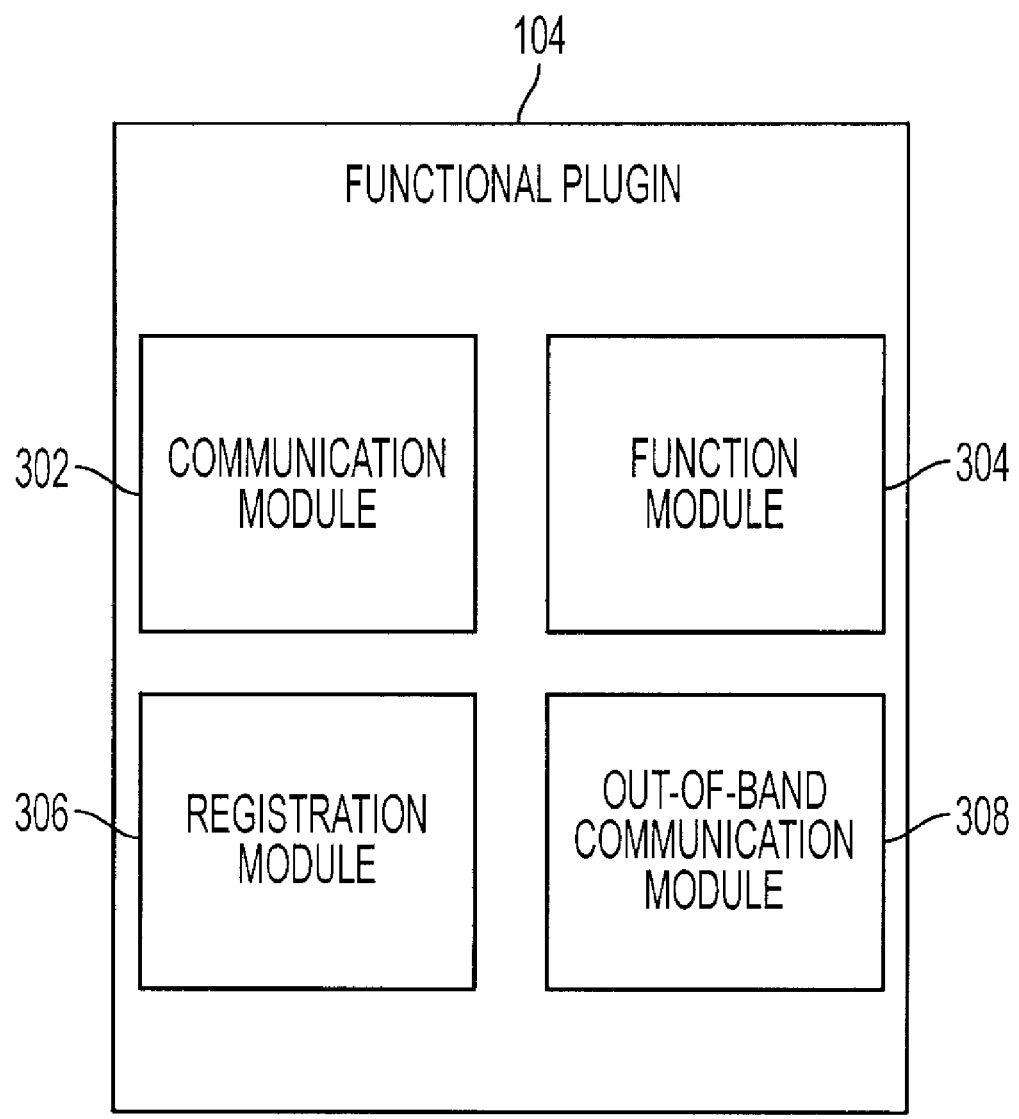
FIG. 3 is a block diagram illustrating a functional plugin, in one embodiment.

FIG. 3 is a block diagram illustrating a functional plugin 104, in one embodiment. The illustrated functional plugin 104 can be on either the appliance 102 or a managed endpoint 108, referred to generally as a computer 200. As mentioned above, the functional plugins 104 provide functionality to the computer 200 to enable the performance of IT tasks. The function module 304 carries out a function that comprises a part of an IT task. For example, a function module 304 may install a software patch, display a desktop alert, or monitor a managed endpoint 108 for various types of activities.

In one embodiment, a functional plugin 104C on an endpoint 108 communicates with a corresponding functional plugin 104S on the appliance 102 to perform an IT task. In this situation, the corresponding plugins 104 may perform complementary tasks. For example, a pair of corresponding plugins 104 may work together to log the activity occurring on a managed endpoint 108. The function module 304 in the appliance functional plugin 104S may issue a command to start monitoring activities. In response, the function module 304 in the endpoint functional plugin 104C may start monitoring various activities and storing them to a local file. At some later point, the function module 304 on the appliance 102 sends a command to the function module 304 on the endpoint 108 requesting the activity data. In response, the function module 304 on the endpoint sends the local file to the function module 304 on the appliance 102, where the activities are stored to a persistent log file for later analysis by an operator of the appliance.

In general, a single functional plugin 104S-2 on the appliance 102 may cooperate with multiple functional plugins 104C-2 on various managed endpoints 108. As a result, the function module 304 in the appliance functional plugin 104S may need to maintain the states of several functional modules 304 from the various managed endpoints 108.

The function module 304 includes a user interface component, in one embodiment. A function module 304 in an appliance functional plugin 104S may interact with the operator of the appliance, such as a member of an IT staff. This user interface may display the status of the various managed endpoints 108 and their corresponding functional plugins 104C. It may also allow the operator to configure the functional plugin 104S or issue commands to the functional plugins 104C. A function module 304 in a managed endpoint functional plugin 104C may also have a user interface component to enable a user of the endpoint 108 to configure the plugin or perform various tasks on the endpoint. The user interface component may also allow the user to view alerts or messages sent from the appliance functional plugin 104S, or to send messages to the appliance functional plugin 104S.

The appliance function plugins 104S and endpoint functional plugins 104C communicate with each other through a communication module 302 or an out-of-band communication module 308, in one embodiment. The communication module 302 sends communications through the built-in plugins 106. For example, a communication from functional plugin 104S-1 to functional plugin 104C-1 through the communication module 302 would be sent from functional plugin 104S-1 to built-in plugin 106S, to built-in plugin 106C (across the network 114), to the communication module of functional plugin 104C-1.

Communications sent through the communication module 302 use the communication protocols provided by the built-in plugins 106. These communication protocols, described further in detail below, can maintain persistent connections that allow for rapid, low-overhead, non-blocking communication between plugins 104 and 106. In general, this communication channel is best suited for smaller messages, such as commands, acknowledgements, or status messages.

The out-of-band communication module 308, on the other hand, communicates over network 114 with the out-of-band communication module 308 of the corresponding functional plugin 104 without sending data through the built-in plugins 106. For example, the out-of-band communication module 308 of functional plugin 104C-1 communicates directly with the out-of-band communication module of functional plugin 104S-1 without going through a built-in plugin 106. The out-of-band communication module 308 does not need to use the communication protocols used by the built-in plugins 106. Instead, the out-of-band communication module 308 can use its own communication mechanism, such as creating a dedicated transmission control protocol (TCP) socket when a new communication needs to be sent and closing the TCP socket when the communication is complete.

The out-of-band communication module 308 can be used for sending large amounts of data that may not be handled well by the persistent connection between the built-in plugins 106. Out-of band communications are also more appropriate for occasional communications where the overhead of opening and closing a new communication pathway for the particular communication is acceptable. For example, in the activity logging example discussed above, short communications such as commands, acknowledgements, and status messages may be sent using the communication module 302, while the activity data file can be sent from the client function plugin 104C to the server functional plugin 104S through the out-of-band communication module 308. The activity data file may be a large file consisting of the details of all activities that have been monitored over a particular time period. Another example of data that can be sent using the out-of-band communication module 308 are large digital payloads from the appliance 102 to an endpoint 108 such as executable programs, operating system updates and patches, other document files, new endpoint plugin executables, or libraries themselves.

In one embodiment, functional plugins 104 are designed in a modular fashion, enabling a functional plugin to be easily added to an appliance 102 or a managed endpoint 108. Modularity is particularly useful for endpoint functional plugins 104C, since an endpoint functional plugin may need to be installed on thousands of managed endpoints 108 in a particular environment 100, where many endpoints have varying hardware and software configurations.

One way that modularity is achieved is through the separation of functionality in the built-in plugin 106 and the various functional plugins 104. The built-in plugin 106 handles communication and coordination tasks, further discussed below, and does not necessarily have knowledge of the functions of the functional plugins 104 or the data formats used by the functional plugins 104 to communicate with each other. Similarly, functional plugins 104 do not necessarily know about the communication protocols used by the built-in plugin 106. The functional plugins 104 provide a message to the built-in plugin 106, and the built-in plugin handles the details of sending the message over the network 114. As a result, functional plugins 104C can be easily added to or removed from an appliance 102 or endpoint 108 provided that they support a predetermined interface provided by the built-in plugin 106.

The registration module 306 of the functional plugin 104 enables the functional plugin to register itself on an appliance 102 or managed endpoint 108. In one embodiment, this registration is part of the installation process of the functional plugin 104. The registration module 306 notifies the built-in plugin 106 that it is being installed on the appliance 102 or endpoint 108. The built-in plugin 106 is then aware of the functional plugin 104 and can provide the functional plugin 104 with messages received from the network 114 that are intended for the functional plugin. Once aware of the functional plugin 104, the built-in plugin 106 can also properly manage the functional plugin as described below. In one embodiment, the registration module 306 also receives a handle to the built-in plugin 106 so that the functional plugin 104 can send messages and requests to the built-in plugin.

Figure 4:
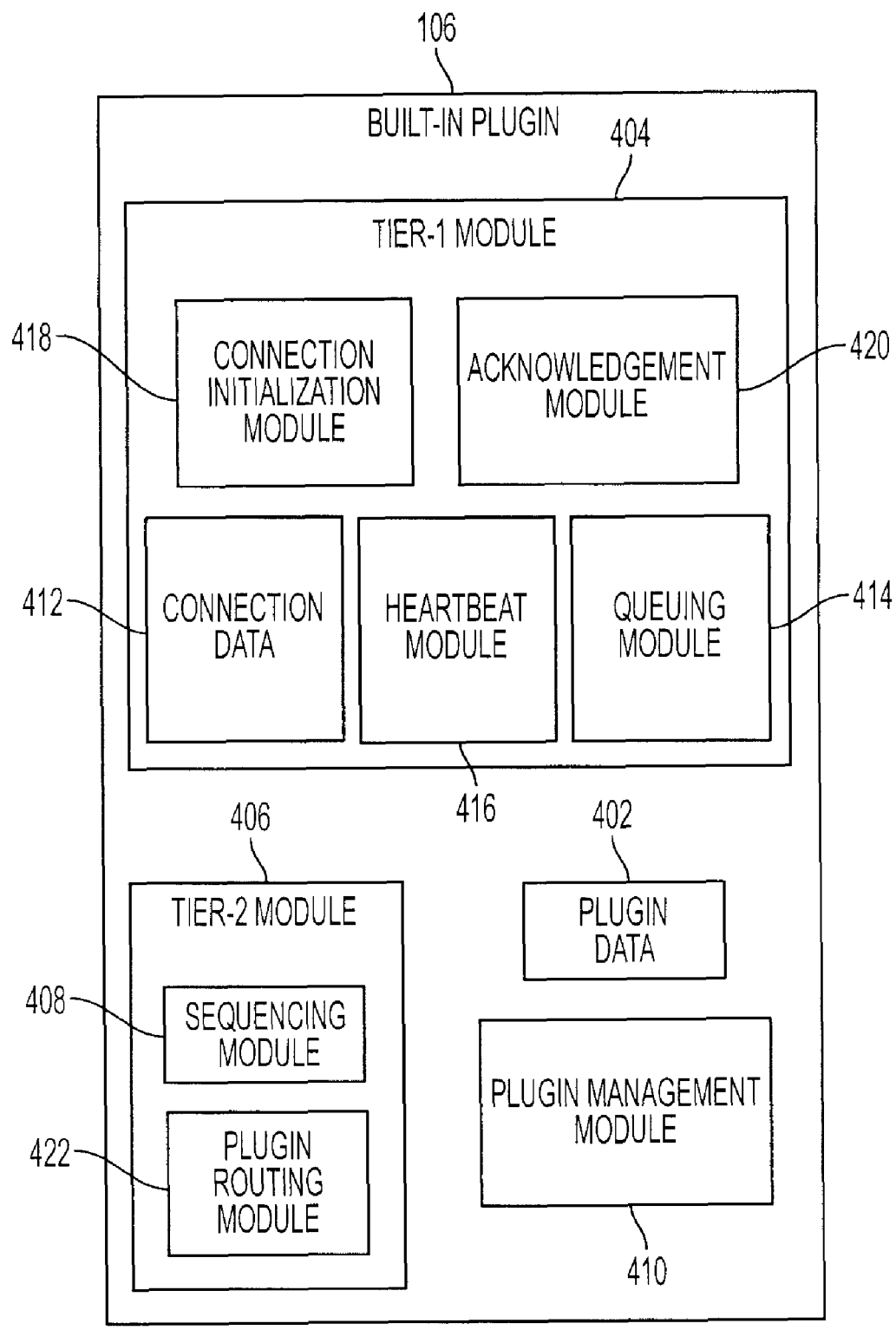
FIG. 4 is a block diagram illustrating a built-in plugin, in one embodiment.

FIG. 4 is a block diagram illustrating a built-in plugin 106, in one embodiment. As mentioned above, the built-in plugin 106 provides communication and management services to the functional plugins 104. The plug-in data 402 maintained by the built-in plugin 106 include a list of the functional plugins 104 that are installed on the computer 200, the computer being an appliance 102 or managed endpoint 108. The plug-in data 402 also include handles for communicating with the functional plugins 104 on the computer 200. Plug-in data 420 may also include version information (e.g., a version number or date) about the functional plugins 104 or other status information about the functional plugins 104. The version information can be used to automatically update the functional plugins as described below. The status information can specify whether the functional plugin 104 is currently active, inactive, or busy, for example. This information, if stored in an endpoint built-in plugin 106C, can be used to respond to status requests from the appliance 102. The status information can also be used in message processing, described below.

The plugin management module 410 performs various management functions for the functional plugins 104. In one embodiment, the registration module 306 of a functional plugin 104 communicates with the plugin management module 410 to register the functional plugin. The plugin management module 410 receives the registration information from the functional plugin 104, and sends necessary information about the built-in plugin 106 to the functional plugin. The plugin management module 410 can also upgrade functional plugins 104, remove functional plugins, and create status reports of functional plugins. In one embodiment, the plugin management module 410 on the appliance 102 is controlled by an operator of the appliance through a user interface. This plugin management module 410 can send commands to plugin management modules on the various managed endpoints 108, requesting them to install, remove, or upgrade functional plugins. A command to install or upgrade a plugin may be accompanied by information specifying a location from where the installation or upgrade image can be downloaded.

The plugin management module 410 on the appliance 102 can also automatically send commands to the plugin management modules on the various managed endpoints 108. For example, the plugin management module 410 can analyze the plug-in data 402 to determine the versions of the functional plugins 104C on the managed endpoints 108. The plugin management module 410 can determine whether the versions are the most recent versions available. If the versions are out of date, the plugin management module 410 can send upgrade commands to the plugin management modules on the managed endpoints 108 with out of date versions of functional plugins 104C.

The tier-1 module 404 and tier-2 module 408 perform various communication tasks for the built-in plugin 106. The tier-1 module 404 handles communications between built-in plugins 106 over the network 114. The tier-2 module 408 handles communications between a built-in plugin 106 and a functional plugin 104 on a computer 200. When sending a message, a functional plugin passes the message to a tier-2 module, which passes the message to the tier-1 module, which sends the message over the network 114. Similarly, when receiving a message, the tier-1 module receives the message from the network 114 and passes the message to the tier-2 module which sends it to a functional plugin 104. Before describing the details of these modules, an overview of the communication protocols is provided.

Figure 5:
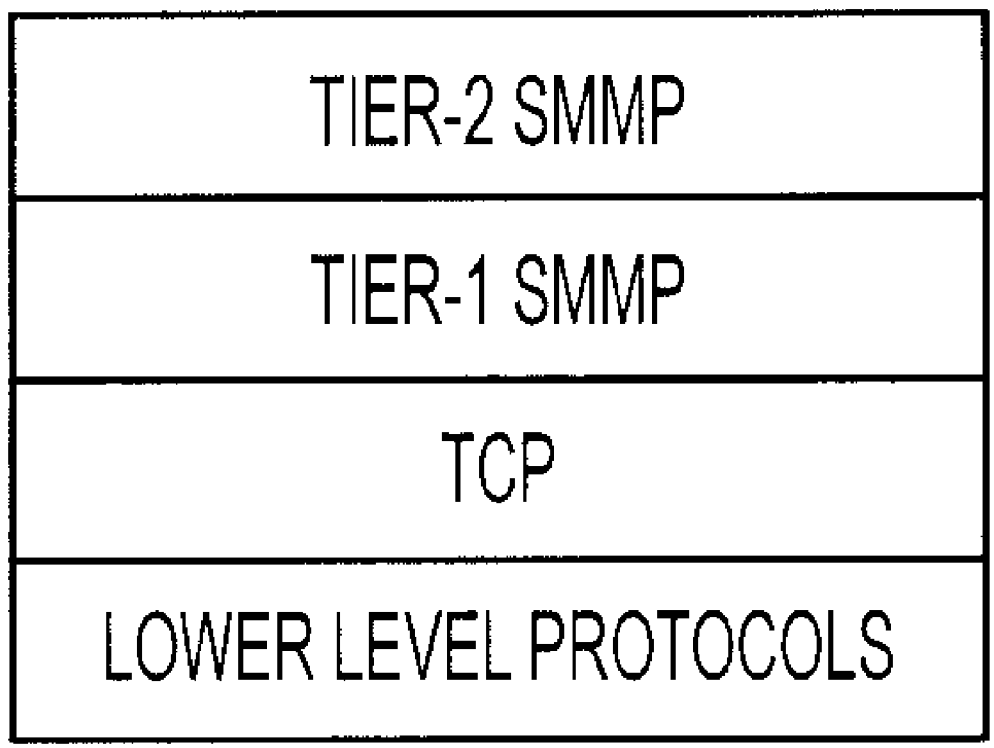
FIG. 5 illustrates a protocol stack for communication between built-in plugins over the network, in one embodiment.

FIG. 5 illustrates a protocol stack for communication between built-in plugins 106 over the network 114, in one embodiment. The two highest layers on the stack are tier-2 and tier-1 of a protocol referred to here as the Systems Management Messaging/Control (SMMP) protocol. The protocol can also be referred to as the Agent Messaging Protocol (AMP). Tier-2 of SMMP contains data understood to functional plugins 104, such as commands sent from plugin 104S-2 to plugin 104C-2. Tier-2 data is generally not understood by the built-in plugins 106 and is treated as an opaque payload by built-in plugins. Tier-2 data can be in any format understood by the functional plugins 104 at the appliance 102 and the managed endpoints 108. Tier-2 data can include various commands, acknowledgements, status messages, or other data needed for functional plugins 104 to carry out IT tasks. Some messages may not have any tier-2 data, such as control or management messages sent between built-in plugins 106 that are not intended for functional plugins 104.

A message sent from one built-in plugin 106 to another includes data from the various layers of the protocol stack. For example, the message may include tier-2 data preceded by tier-1 data preceded by a Transmission Control Protocol (TCP) header preceded by lower level protocol headers. A functional plugin 104 can send tier-2 data to the built-in plugin 106 on the same computer 200. The built-in plugin 106 prepends tier-1 data to the message, the tier-1 data including an indication of the type of functional plugin 104 corresponding to the tier-2 data. The built-in plugin 106 can then send the message across the network 114 after prepending appropriate TCP and lower level protocol headers. When the message is received by the destination computer 200, the message is sent to the receiving built-in plugin 106 and the TCP and lower level headers are removed. The built-in plugin 106 processes the tier-1 data and removes it from the message. Since the tier-1 data indicates the type of functional plugin 104, the tier-2 data can be sent to the appropriate functional plugin.

In the example protocol stack illustrated in FIG. 5, the SMMP layer data are sent using TCP, optionally with Secure Sockets Layer (SSL). TCP provides reliable delivery and other services, such as flow control, that may be useful for built-in and functional plugins 106 and 104. However, TCP is not required, and a variety of alternative protocols known in the art can be used instead of or in addition to TCP. Various lower level protocols can also be used for transporting the message across the network 114. Examples of lower level protocols include the Internet Protocol (IP), Ethernet, and Asynchronous Transfer Mode (ATM).

The tier-2 module 406 handles communication of tier-2 data with the functional plugins 104. When a functional plugin 104 wants to send tier-2 data to a functional plugin on another computer 200, the functional plugin provides the tier-2 data and intended destination to the tier-2 module 406. As mentioned above, the registration module 306 of the functional plugin 104 may have received a handle or API function from the plugin management module 410 at registration for communicating with the tier-2 module 406. When communicating with the tier-2 module 406, the functional plugin 104 may specify that the message is to be sent to corresponding functional plugins on multiple computers 200. For example, a functional plugin 104 on the appliance 102 may specify that the message be sent to functional plugins on hundreds of managed endpoints 108.

The tier-2 module 406 also handles incoming messages received from the tier-1 module 404 destined for a functional plugin 104 on the computer 200. In one embodiment, the tier-1 module 404 decodes the tier-1 data in an incoming message, including data specifying the destination functional plugin 104. The tier-1 module 404 provides the message to the tier-2 module 406 along with an indication of the destination functional plugin 104. The plugin routing module 422 sends the message to the appropriate destination plugin 104, possibly using a handle in the plugin data 402 to access the destination plugin.

The sequencing module 408 of the tier-2 module 406 determines a sequencing number to be associated with a tier-2 message received from a functional plugin 104. The sequencing module 408 can maintain a counter for each associated functional plugin 104, using the current value of the counter as the sequencing number and subsequently incrementing the counter. The sequencing number is passed to the tier-1 module 404 and included in the tier-1 data of the outgoing message. When a built-in plugin 106 on the receiving computer 200 receives the message, it returns an acknowledgement message, as described below, that includes the sequence number. The sequencing module 414 can use the sequence number in the received acknowledgement message to determine which message it corresponds to by matching the sequence numbers. When the sequencing module 414 determines that a received acknowledgement message corresponds to a previously sent message, the sequencing module can pass the acknowledgement to the appropriate functional plugin 104 through the routing module 422. In one embodiment, the sequencing module 414 keeps a description of the previous message, so that the sequencing module can provide the functional plugin 104 with the acknowledgement along with a description of the previously sent message.

The tier-1 module 404 maintains persistent connections over the network 114 with other built-in plugins 106, and processes tier-1 SMMP data, in one embodiment. The persistent connections can be used when needed for control messages between built-in plugins 106 and for messages between functional plugins 104. The built-in plugin 106 on an appliance 102 may maintain a persistent connection with the built-in plugin of each managed endpoint 108. In this case, the tier-1 module 404 on the appliance built-in plugin 106S maintains multiple connections, each connection with the built-in plugin 106C of a managed endpoint 108. These persistent connections can be implemented as TCP sockets that remain open even when there is no immediate communication to be sent. When any message needs to be sent, it can be sent by the tier-1 module 404 without the overhead of opening a new connection.

The persistent connections are initiated by the connection initiation module 418. In one embodiment, the connection initiation module 418 in the built-in plugin on the managed endpoint 108 (rather than on the appliance 102) initiates the persistent connection. The connection initiation module 418 on the managed endpoint 108 can be initially provided with the location of the appliance 102, for example through a dynamic host control protocol (DHCP) server. The connection initiation module 418 can then open a connection with the built-in plugin 106S on the appliance 102, for example by sending a TCP SYN packet, receiving a TCP SYN-ACK packet from the managed endpoint 108, and so forth. As mentioned above, other protocols besides TCP may be used.

Opening the persistent connection from the managed endpoint 108 provides several benefits. One benefit is that the appliance 102 is automatically notified when a managed endpoint 108 comes online. No additional mechanism is needed for the appliance 102 to learn of the existence of a managed endpoint 108. Another benefit is that a connection can be established through a firewall 116. Often, a firewall 116 will be configured, for security reasons, to block incoming requests for connections to a managed endpoint 108. However, the firewall will not block a connection initiated from a managed endpoint 108, enabling a persistent connection to be established. Once established, the connection can be used for communications initiated by the appliance 102 as well as the managed endpoint 108. The firewall 116 is illustrated as being a separate component from the managed endpoint 108 in FIG. 1, though it is possible for the firewall to be integrated with the managed endpoint.

Once a persistent connection is established, the connection initiation module 418 can send configuration data to the connection initiation module 418 of the built-in plugin 106 on the other computer 200. This configuration data can include data about installed plugins 104 retrieved from the plugin data 402 or other data about the computer 200 such as its hardware or software configuration. In one embodiment, the connection initiation modules 418 on one or both computers 200 stores any received configuration data in the connection data 412, described below.

The connection data 412 maintains data associated with the persistent connections. A managed endpoint 108 may have one persistent connection with a single appliance 102 or a few persistent connections, for example with an appliance and a backup appliance. An appliance 102, on the other hand, may have thousands of persistent connections with various managed endpoints 108. Connection data 412 on an appliance 102 can include a list of connections and information about the connections, such as the identity of the managed endpoint 108 associated with each connection and a list of functional plugins 104 at the associated managed endpoint. Connection data 412 can also include the status of the persistent connection, indicating if the connection is currently active and the time of the last communication over the connection.

The connection data 412 can be consulted when a built-in plugin 106 on an appliance 102 wants to send messages to several managed endpoints 108. For example, a functional plugin 104 on the appliance 102 may want to send a desktop alert to functional plugins on several managed endpoints 108. The connection data 412 can be used to determine which endpoints 108 currently have active persistent connections and have the desktop alert functional plugin 104. The built-in plugin 106 on the appliance 102 can then send the desktop alert message to only those managed endpoints 108, conserving processing and bandwidth resources. In general, the connection data 412 enables the built-in plugin 106 to iterate through a set of persistent connections and send relevant data across the connections.

The heartbeat module 416 maintains the persistent connections through what is referred to as "heartbeat" messages. In one embodiment, the endpoint built-in plugin 106C sends a heartbeat message periodically to the appliance built-in plugin 106S. A heartbeat message can be any predefined message understood by the appliance 102 and managed endpoints 108. Since a heartbeat message is only used by built-in plugins 106, the message does not have any tier-2 SMMP data. The heartbeat message can be sent at regular intervals, and if the appliance 102 does not receive a heartbeat message over a connection for a long period of time, the appliance can consider the managed endpoint 108 to have disconnected and can mark the connection as inactive in the connection data 412. The appliance 102 can also close the TCP socket associated with the connection after a certain period of time. The time that the last heartbeat message was received can be stored in the connection data 412. A managed endpoint 108 (or an appliance 102) can also terminate a connection with an explicit "disconnect" message.

The heartbeat messages enable the appliance 102 to maintain the current status of connections to various managed endpoints 108 so that resources are not spent sending messages to inactive endpoints. Managed endpoints 108 may go offline for various reasons, such as the endpoint being powered down, the endpoint malfunctioning, or a problem in the network 114. A connection unexpectedly going inactive as a result of no further heartbeat messages being received can also be a trigger for the appliance 102 to take some action. The appliance 102 can notify an operator of the situation, or a functional plugin 104 on the appliance can send a message to a functional plugin on a second managed endpoint 108, reconfiguring the second managed endpoint to take over the functions of the disconnected managed endpoint.

By maintaining persistent connections with heartbeat monitoring, the appliance 102 is able to efficiently manage the connections and communicate over the connections. The appliance 102 can send messages to thousands of appliances with relatively little overhead because the connections are already open. There is no need to open a new connection and close the connection after sending the message, both of which typically require waiting for an acknowledgement (e.g., with TCP).

As mentioned above, the tier-1 module 404 forwards messages between appliance functional plugins 104S and managed endpoint functional plugins 104C. In one embodiment, the queuing module 414 and acknowledgement module 420 perform some of these functions. The queuing module 414 queues messages to be sent over the network 114. Generally, these messages are received from functional plugins 104, though the messages may also be generated by the tier-1 module 404 itself (e.g., heartbeat messages). The queuing module 414 can then send messages from the queue when network resources are available. The queuing module 414 can implement a priority system where some functional plugins 104 have higher priorities than others. In one embodiment, the queuing module 414 also attaches tier-1 data to the tier-2 data received from the functional plugin. This tier-1 data can indicate the type of functional plugin 104 and a sequence number, as described above.

In one embodiment, the queuing module 414 on the appliance 102 is able to process and load balance all messages from functional plugins 104 and all tasks of the functional plugins. Messages to be sent and tasks to be completed can be received by the queuing module 414, and the queuing module can take into consideration the priority of each of the tasks and messages and the availability of processing and other resources on the appliance 102 in order to execute the tasks and send the messages as timely as possible.

The acknowledgement module 420 provides acknowledgements for messages received from the network 114. When a message is received by the built-in plugin 106 and successfully delivered to a destination functional plugin 104 by the plugin routing module 422, an acknowledgement message (ACK) can be generated and sent back to the originating built-in plugin on the remote computer 200. If the plugin routing module 422 was not able to deliver the message, then a negative acknowledgement (NACK) can be sent to the remote computer 200. This can occur, for example, if the intended destination functional plugin 104 is not installed on the destination computer 200. The sequence number from the tier-1 data of the received message can be included in the acknowledgement so that the sequencing module 422 at the remote computer 200 can match the acknowledgement to the sent message, as described above.

The ACK and NACK messages are tier-1 messages sent between built-in plugins 106 and do not have a tier-2 layer. The ACK or NACK messages indicate whether the original message was delivered properly to the functional plugin 104, rather than whether the functional plugin was able to fully process the message. For example, a message to a functional plugin 104 may contain a command for the plugin to perform a disk defragmentation operation that takes a significant amount of time. The acknowledgement module 420 at the destination returns an ACK immediately indicating that the command was delivered. At a later point, the functional plugin 104 at the managed endpoint 108 may send a message (with tier-2 data) to the functional plugin at the appliance 102 indicating that the defragmentation operation completed successfully.

Because acknowledgments are returned immediately, an appliance 102 can receive rapid feedback on an issued command and avoid spending resources waiting for a response to a command. The persistent connection also enables rapid, low-overhead acknowledgements. For example, an appliance 102 can send SMMP messages to thousands of managed endpoints 108 in rapid succession and keep track of which managed endpoints respond with an ACK. If a managed endpoint 108 does not respond, the appliance 102 can retry the message or remove the persistent connection associated with the managed endpoint from the list of active connections in the connection data 412. If a client responds with a NACK, the appliance 102 can update its connection data associated with the endpoint 108 to indicate that the endpoint does not have the expected functional plugin 104.

In addition to the endpoint-initiated persistent connections, persistent connections can be initiated by a connection initiation module 418 on the appliance 102. This enables the appliance 102 to initiate a connection whenever it desires rather than wait for the endpoint 108 to initiate. If the appliance 102 does not know the location of the endpoint 108 in advance, the appliance may send a broadcast or multicast initiation message. However, as mentioned above, firewalls 116 may block connections initiated by the appliance 102.

An alternative to a persistent connection is an interval-based connection. In this type of connection, the connection initiation module 418 on the endpoint 108 can open a new connection to the appliance 102 at defined intervals (such as once per five minutes). With each new connection, the endpoint 108 updates the appliance 102 with current configuration information and receives any instructions from the appliance that the appliance has been queuing up since the last connection. This type of communication may be useful where avoiding a persistent connection is desired.

Figure 6:
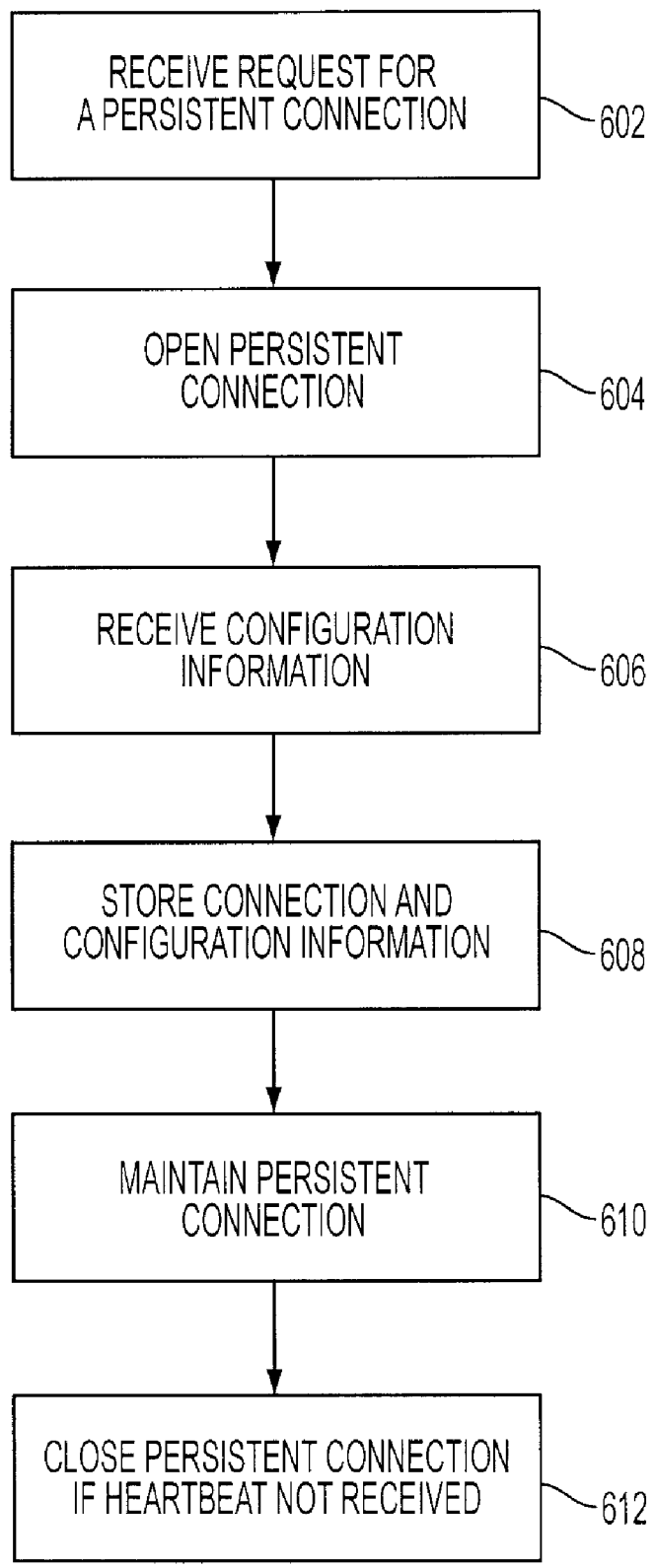
FIG. 6 is a flowchart illustrating a method for creating and maintaining a persistent connection between an appliance and a managed endpoint, in one embodiment.

FIG. 6 is a flowchart illustrating a method for creating and maintaining a persistent connection between an appliance 102 and a managed endpoint 108, in one embodiment. A request for a persistent connection is received 602 by the appliance 102 from a managed endpoint 108. This request can be, for example, a TCP SYN packet. The appliance 102 responds and opens 604 the persistent connection. The appliance 102 then receives 606 configuration information from the managed endpoint 108. This configuration information can include information about the functional plugins 104 installed on the managed endpoint 108 and the hardware and software configuration of the managed endpoint. The appliance 102 stores 608 the configuration information and information associated with the persistent connection (e.g., indicating that the connection is active).

The persistent connection is maintained 610 in an open state, even if there is no immediate need for further communications. The persistent connection can be used to send messages between functional plugins 104 on the appliance 102 and the managed endpoint 108 without the need to create a new connection for each message. In one embodiment, the built-in plugin 106 on the managed endpoint 108 sends a heartbeat message to the built-in plugin on the appliance 102 at regular time intervals. If a heartbeat message is not received by the appliance 102 when expected, the appliance may mark the persistent connection as inactive and close 612 the persistent connection.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

We claim:

1. A computer-implemented method for performing information technology (IT) tasks using a computer, the method comprising:
   receiving a request for a persistent connection over a network from a managed endpoint;
   accepting the request and opening the persistent connection with the managed endpoint;
   receiving configuration information from the managed endpoint, the configuration information comprising a list of functional plugins on the managed endpoint, a functional plugin comprising a software module for performing an IT task;
   storing information describing the persistent connection and the configuration information;
   maintaining the persistent connection in an open state as a TCP socket that remains open when there is no immediate communication to be sent; and
   sending a message to the managed endpoint over the persistent connection without opening a new connection.

2. The computer-implemented method of claim 1, wherein the message to the managed endpoint traverses a firewall configured to block connection requests directed to the managed endpoint.

3. The computer-implemented method of claim 1, further comprising:
   responsive to not receiving a heartbeat message within a predetermined period of time, closing the persistent connection and storing information indicating the persistent connection is closed.

4. The computer-implemented method of claim 1, further comprising:
   receiving a notification from a functional plugin on the computer, the notification indicating a command for execution on a managed endpoint; and
   sending a command message to the managed endpoint using the persistent connection, the command message comprising the command, the command message further comprising an indication of a type of functional plugin at the managed endpoint.

5. The computer-implemented method of claim 4, further comprising:
receiving an acknowledgement message from the managed endpoint that the command message was delivered, the acknowledgement received prior to the command completing execution on the managed endpoint.

6. The computer-implemented method of claim 5, further comprising:
responsive at least in part to a sequence number in the acknowledgement message, notifying the functional plugin from which the notification was received that the message was delivered.

7. The computer-implemented method of claim 4, further comprising:
placing the command message in a queue; and
removing the command message from the queue based at least in part on a relative priority of the functional plugin from which the notification was received.

8. The computer-implemented method of claim 1, further comprising:
receiving version information from the managed endpoint, the version information indicating a version of a functional plugin on the managed endpoint;
determining whether the version is a most recent version;
responsive to the version not being the most recent version, sending an upgrade message to the managed endpoint, the upgrade message including instructions for upgrading the functional plugin.

9. A system for performing information technology (IT) tasks using a computer, the system comprising:
a non-transitory computer-readable storage medium storing executable computer program modules comprising:
a connection initialization module for receiving a request for a persistent connection over a network from a managed endpoint, the connection initialization module further for accepting the request and opening the persistent connection with the managed endpoint; and
a tier-1 module for receiving configuration information from the managed endpoint, the configuration information comprising a list of functional plugins on the managed endpoint, a functional plugin comprising a software module for performing an IT task, the tier-1 module further for storing information describing the persistent connection and the configuration information, the tier-1 module further for maintaining the persistent connection in an open state as a TCP socket that remains open when there is no immediate communication to be sent and for sending a message to the managed endpoint over the persistent connection without opening a new connection.

10. The system of claim 9, wherein the message to the managed endpoint traverses a firewall configured to block connection requests directed to the managed endpoint.

11. The system of claim 9, further comprising:
a heartbeat module for, responsive to not receiving a heartbeat message within a predetermined period of time, closing the persistent connection and storing information indicating the persistent connection is closed.

12. The system of claim 9, further comprising:
a tier-2 module for receiving a notification from a functional plugin on the computer, the notification indicating a command for execution on a managed endpoint, and wherein the tier-1 module is further configured for sending a command message to the managed endpoint using the persistent connection, the command message comprising the command, the command message further comprising an indication of a type of a functional plugin at the managed endpoint.

13. The system of claim 12, further comprising:
an acknowledgement module for receiving an acknowledgement message from the managed endpoint that the command message was delivered, the acknowledgement received prior to the command completing execution on the managed endpoint.

14. The system of claim 13, further comprising:
a sequencing module for, responsive at least in part to a sequence number in the acknowledgement message, notifying the functional plugin from which the notification was received that the message was delivered.

15. The system of claim 12, further comprising:
a queuing module for placing the command message in a queue, and for removing the command message from the queue based at least in part on a relative priority of the source functional plugin.

16. The system of claim 9, further comprising:
a plugin management module for receiving version information from the managed endpoint, the version information indicating a version of a functional plugin on the managed endpoint, the plugin management module further for determining whether the version is a most recent version, the plugin management module further for, responsive to the version not being the most recent version, sending an upgrade message to the managed endpoint, the upgrade message including instructions for upgrading the functional plugin.

17. A computer program product having a non-transitory computer-readable storage medium having executable computer program instructions recorded thereon for performing information technology (IT) tasks using a computer, comprising:
a connection initialization module for receiving a request for a persistent connection over a network from a managed endpoint, the connection initialization module further for accepting the request and opening the persistent connection with the managed endpoint; and
a tier-1 module for receiving configuration information from the managed endpoint, the configuration information comprising a list of functional plugins on the managed endpoint, a functional plugin comprising a software module for performing an IT task, the tier-1 module further for storing information describing the persistent connection and the configuration information, the tier-1 module further for maintaining the persistent connection in an open state as a TCP socket that remains open when there is no immediate communication to be sent and sending a message to the managed endpoint over the persistent connection without opening a new connection.

18. The computer program product of claim 17, wherein the message to the managed endpoint traverses a firewall configured to block connection requests directed to the managed endpoint.

19. The computer program product of claim 17, further comprising:
a heartbeat module for, responsive to not receiving a heartbeat message within a predetermined period of time, closing the persistent connection and storing information indicating the persistent connection is closed.

20. The computer program product of claim 17, further comprising:

a tier-2 module for receiving a notification from a functional plugin on the computer, the notification indicating a command for execution on a managed endpoint, and wherein the tier-1 module is further configured for sending a command message to the managed endpoint using the persistent connection, the command message comprising the command, the command message further comprising an indication of a type of a functional plugin at the managed endpoint.

21. The computer program product of claim 20, further comprising:

an acknowledgement module for receiving an acknowledgement message from the managed endpoint that the command message was delivered, the acknowledgement received prior to the command completing execution on the managed endpoint.

22. The computer program product of claim 21, further comprising:

a sequencing module for, responsive at least in part to a sequence number in the acknowledgement message, notifying the functional plugin from which the notification was received that the message was delivered.

23. The computer program product of claim 20, further comprising:

a queuing module for placing the command message in a queue, and for removing the command message from the queue based at least in part on a relative priority of the source functional plugin.

24. The computer program product of claim 17, further comprising:

a plugin management module for receiving version information from the managed endpoint, the version information indicating a version of a functional plugin on the managed endpoint, the plugin management module further for determining whether the version is a most recent version, the plugin management module further for, responsive to the version not being the most recent version, sending an upgrade message to the managed endpoint, the upgrade message including instructions for upgrading the functional plugin.

* * * * *